Patented Mar. 25, 1930

1,752,075

UNITED STATES PATENT OFFICE

EUGEN GLIETENBERG AND AUGUST SIGWART, OF LEVERKUSEN-ON-THE-RHINE, GERMANY, ASSIGNORS TO GENERAL ANILINE WORKS, INC., OF NEW YORK, N. Y., A CORPORATION OF DELAWARE

AZO DYESTUFFS AND PROCESS OF PREPARING SAME

No Drawing. Application filed November 28, 1927, Serial No. 236,362, and in Germany December 3, 1926.

The present invention concerns new and valuable insoluble greenish-yellow pigment dyestuffs and a process of preparing same. They are obtained by diazotizing an amino-compound of the following general formula:

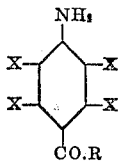

(in which R signifies an aliphatic or aromatic residue and $x$ hydrogen, or a monovalent substituent, for example, $NO_2$, or halogen) and coupling with an acetoacet-arylide, the aromatic residues of which can also be substituted, for example, by halogen or $NO_2$.

The new dyestuffs are applied in the form of oil pigments and size colors and constitute a valuable extension of the hitherto known products in the direction of the green portion of the spectrum and are particularly distinguished by their extraordinary fastness to light.

They are after being dried and pulverized yellowish powders insoluble in water having most probably the following general formula:

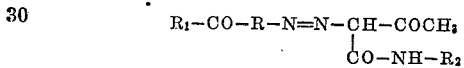

in which R and $R_2$ stand for an aryl group which may be substituted, for example, by halogen or $NO_2$ and $R_1$ signifies an alkyl or aryl group. They yield upon reduction with stannous chloride and hydrochloric acid an amino-ketone which may be substituted and an amino-acetoacet-arylide.

The following examples will illustrate our invention:

*Example 1.*—135 parts by weight of para-amino-aceto-phenone are diazotized in the customary manner with the calculated quantity of hydrochloric acid and sodium nitrite while being cooled with ice. This diazo solution is poured with stirring into a solution of 177 parts by weight of aceto-acetanilide and 200 parts by weight of anhydrous sodium acetate in 2000 parts by weight of glacial acetic acid. The formation of the dyestuff is complete after several hours stirring. The precipitated dyestuff is filtered, well washed and further worked up for the preparation of pigment dyestuffs. It has most probably the formula:

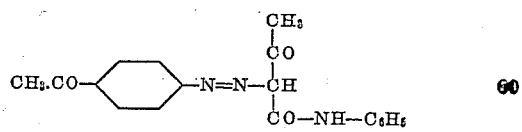

It is a yellow powder insoluble in water, yielding upon reduction with stannous chloride and hydrochloric acid para-amino-aceto-phenone and amino-acetoacet-anilide.

Instead of coupling in glacial acetic acid the process can also be carried out in aqueous solution in such a manner that the acetoacetanilide is first rendered soluble with caustic soda solution and then acetic acid is cautiously added until the acetoacetanilide just commences to separate out.

*Example 2.*—180 parts by weight of para-amino-3-nitro-acetophenone are diazotized with the calculated quantity of sodium nitrite and hydrochloric acid and the diazo solution is added with stirring to a solution of 212 parts by weight of acetoacet-chloro-anilide and 200 parts by weight of anhydrous sodium acetate in 2000 parts by weight of glacial acetic acid. When the coupling is completed, the whole is filtered and washed. The coupling can also be carried out in aqueous solution instead of in glacial acetic acid, as indicated in Example 1. The resulting dyestuff possesses the following constitution:

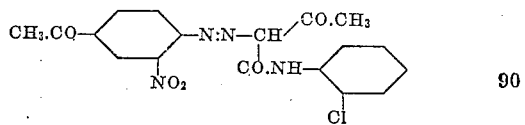

and crystallizes from glacial acetic acid in long greenish yellow needles, melting at 269 to 270° C.

*Example 3.*—197 parts by weight of para-amino-benzo-phenone are diazotized with the calculated quantity of sodium nitrite and hydrochloric acid and the diazo solution is added to a solution of 212 parts by weight of acetoacetchloro-anilide and 200 parts by weight of anhydrous sodium acetate is 2000 parts by weight of glacial acetic acid. When the formation of the dyestuff has been completed the whole is filtered and washed. The coupling can also be carried out in aqueous solution instead of in glacial acetic acid whereby care must be taken to avoid an alkaline reaction.

The resulting dyestuff possesses the following constitution:

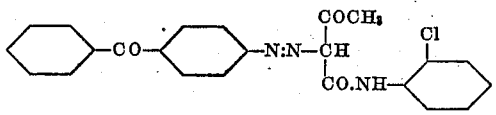

It crystallizes from glacial acetic acid in greenish yellow needles, melting at 159 to 160° C.

We claim:

1. In the process for the manufacture of insoluble azo dyestuffs the step which comprises coupling a diazotized amino-compound of the general formula:

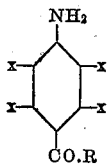

in which R signifies an aliphatic or aromatic residue and $x$ stands for hydrogen or a monovalent substituent with an acetoacet-arylamide.

2. In the process for the manufacture of insoluble azo dyestuffs the step which comprises coupling a diazotized amino-compound of the general formula:

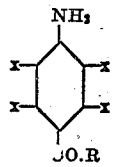

in which R signifies an aliphatic or aromatic residue and $x$ stands for hydrogen, $NO_2$ or halogen, with an acetoacetarylamide.

3. In the process for the manufacture of insoluble azo dyestuffs the step which comprises coupling a diazotized para-amino-acetophenone compound with an acetoacetarylamide.

4. The new dyes having most probably the formula:

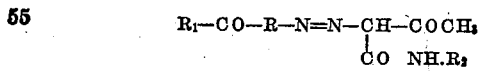

in which R stands for a benzene nucleus which may be substituted, $R_2$ stands for an aryl group which may be substituted and $R_1$ stands for an alkyl or aryl group, being yellowish powders insoluble in water, yielding upon reduction with stannous chloride and hydrochloric acid an amino-ketone which may be substituted and an amino-acetoacetarylide, and being greenish-yellow pigment dyes fast to light.

5. The new dyes having most probably the formula:

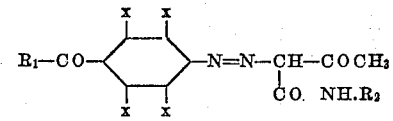

in which $x$ stands for hydrogen, $NO_2$ or halogen, $R_2$ stands for an aryl group which may be substituted by $NO_2$ or halogen, and $R_1$ stands for an alkyl or aryl group, being yellowish powders insoluble in water, yielding upon reduction with stannous chloride and hydrochloric acid an amino-ketone which may be substituted and an amino-acetoacetarylide, and being greenish-yellow pigment dyes fast to light.

6. The new dye having most probably the formula:

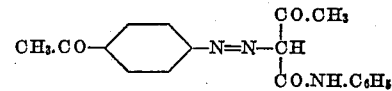

being a yellow powder insoluble in water, yielding upon reduction with stannous chloride and hydrochloric acid para-aminoacetophenone and amino-aceto-acetanilide and being a greenish-yellow pigment dye fast to light.

In testimony whereof we have hereunto set our hands.

EUGEN GLIETENBERG.
AUGUST SIGWART.